United States Patent [19]

Thompson

[11] 3,921,204

[45] Nov. 18, 1975

[54] DIGITAL ENCODING SYSTEM

[75] Inventor: John Edward Thompson, Watford, England

[73] Assignee: The Post Office, London, England

[22] Filed: Aug. 18, 1972

[21] Appl. No.: 281,807

[30] Foreign Application Priority Data

Aug. 27, 1971 United Kingdom .............. 40309/71

[52] U.S. Cl. ............ 358/13; 178/DIG. 3; 325/38 B; 328/135

[51] Int. Cl.$^2$ ....................... H04N 5/40; H04N 9/40

[58] Field of Search ............... 178/5.2 R, 5.4 R, 6.8, 178/DIG. 3, DIG. 23; 325/38 R, 38 B, 39; 328/135; 179/15 AP, 15 BT

[56] References Cited

UNITED STATES PATENTS

| | | | |
|---|---|---|---|
| 3,689,840 | 9/1972 | Brown et al. | 178/DIG. 3 |
| 3,720,780 | 3/1973 | Remy et al. | 358/13 |
| 3,720,780 | 3/1973 | Remy et al. | 178/5.2 R |
| 3,723,879 | 3/1973 | Kaul et al. | 178/DIG. 3 |
| 3,773,971 | 11/1973 | Sainte-Beuve | 358/13 |
| 3,795,763 | 3/1974 | Golding et al. | 178/5.6 |
| 3,800,225 | 3/1974 | Meares | 325/38 B |

*Primary Examiner*—George H. Libman
*Assistant Examiner*—Marc E. Bookbinder
*Attorney, Agent, or Firm*—Hall & Houghton

[57] ABSTRACT

Methods of encoding in digital form an analogue signal including a modulated sub-carrier wave, such as a colour television video signal, are described in which the rate of sampling of the analogue signal is a simple factor, for example 3, times the frequency of the sub-carrier wave. The methods of encoding include comparing the instantaneous value of the analogue signal with a previously occurring value, which conveniently is spaced by one or more cycles of the sub-carrier from the instantaneous value, and then encoding the difference between the two values. From an N.T.S.C. signal the spacing between the two values may be one cycle of the sub-carrier wave, or about one line of the scan, (the actual spacing being an integral number of cycles of the sub-carrier wave, or both differences can be combined to produce a diagonal difference signal. The same spacings can be used for a PAL signal if a PAL modifier is used, otherwise a vertical spacing of two lines is necessary because of the change of phase of the sub-carrier in alternate lines. The differences from several spacings can be combined trigonometrically to synthesise a difference corresponding to a desired spacing, such as one cycle of the sub-carrier wave.

18 Claims, 9 Drawing Figures

DIGITAL ENCODING SYSTEM

This invention relates to a system for the digital encoding of analogue signals including a component modulated on a sub-carrier, and is particularly advantageous in connection with the digital encoding of a colour television signal constructed according to the NTSC or PAL system.

In any digital encoding system it is important that the coded signal should represent an analogue signal from which it is derived as closely as possible with a minimum of redundancy, so as to economize on the bandwidth of any channel over which the signal is to be transmitted. To this end there has been proposed a digital encoding process known as Differential Pulse Code Modulation, herein abbreviated DPCM, in which instead of digitizing the instantaneous value of the signal, the difference between the instantaneous signal value and a previous value of the signal is digitized. In general, DPCM can be classed as a "predictive" type of encoding in that it exploits the predictability (i.e. redundancy) of a signal to achieve a reduced digit rate for pulse code modulation PCM, transmission. For a monochrome television signal redundancy (sample by sample) is high, as is evidenced by its signal power spectrum which has a predominance of energy at low frequencies. Predictability is also intuitively reasonable as "typical" television pictures contain large areas of constant or near-constant brightness; i.e. given the amplitude of any signal sample there is a high probability that the following sample will have very nearly the same value. Thus differential encoders, which encode the differences between successive samples rather than the absolute magnitudes of the samples themselves, have been built to give substantially less quantizing error than PCM for the same data rate. Typically, for 625 line monochrome television broadcast signals 3 bits/sample DPCM gives similar picture quality to 5 bits/sample PCM; for lower resolution (319 line) Viewphone signals 4 bit/sample DPCM gives a high quality picture equivalent to 6 or 7 bits/sample PCM.

Subjectively, DPCM makes more efficient use of any given number of quantization levels by exploiting the fact that the eye-brain system is relatively insensitive to quantization errors in detailed parts of an image. The DPCM system quantizes low-detailed regions of the picture very finely to avoid contouring and granular quantizing noise since this is highly visible in these regions. Channel capacity is saved by coding the high-detail regions relatively coarsely, i.e. most of the DPCM quantizing error is concentrated at edges and in detail of the picture where it is least visible. DPCM is thus characterised by the attenuation through coarse quantizing of high frequency signal components.

If, however, this coding is applied to a composite 625 line colour television signal constructed according to the NTSC or PAL system there is a considerable loss of colour saturation and a gross amount of granular quantizing noise, because although a coloured picture is almost as redundant as the monochrome one, in that it has large areas of constant brightness and colour, in the NTSC and PAL systems the colour hue and saturation information are represented respectively by the phase and amplitude of a sub-carrier of frequency near the high frequency limit of the video spectrum. The video signal therefore has no areas of constant voltage, except where the colour is neutral, and consequently the sub-carrier is of zero amplitude, so that the DPCM system is perpetually is a state of "slope overload" as defined later, from attempting to follow the sub-carrier sinusoids, thus causing gross quantizing error.

This apparent incompatibility between DPCM and carrier systems of analogue colour television transmission (PAL, NTSC) has led to alternative proposals for coding colour television by splitting the composite PAL or NTSC signal into its primary red, green and blue components (or into Y, I and Q signals representing luminance and two colour difference signals) so that each component may be coded separately by one of three DPCM systems whose outputs are time division multiplexed for digital transmission. If further analogue transmission were required the decoded colour component signals would have to be reduced into the PAL or NTSC format. Schemes of this sort have the disadvantage that although the PAL format is an extremely robust package which contains considerable fine adjustment of colour balance prior to coding and which can maintain this balance even under most severe channel distortions (e.g. differential gain and phase), dismembering and reassembly of the PAL format for intermediate digital transmission requires at least as careful control of the gains and phases of the three component signals as were imposed in the television studio. Furthermore, the PAL carrier system already represents an ingenious "bandwidth compression" system which inserts colour information into the monochrome television signal bandwidth for compatible reception by monochrome or colour receivers. It was developed for transmission in the same form between studio and domestic receiver and was not intended to cater for decoding and recoding at intermediate points (other than for the unavoidable circumstance of standards conversion between countries).. Each encoding/decoding operation irreparably reduces picture resolution and introduces degradations which discourage the use of more than one PAL (or NTSC) coder in any one link.

It is an object of the present invention to provide a differential pulse code modulation system which is applicable to an analogue signal including a sub-carrier in which the disadvantages set out above are avoided.

According to the present invention there is provided a method of digitally encoding an analogue signal including a base band component and a modulated sub-carrier wave, in which at each sampling instant an instantaneous value of the analogue signal is compared with a previous value of the signal and the difference encoded in digital form, wherein the previous value of the analogue signal has the same sub-carrier phase as the instantaneous value. A preferred value for the sampling rate is three times the frequency of the sub-carrier wave, although factors in the form of mixed numbers such as, for example, two and a half can be employed. Alternatively a higher sampling rate can be used such as, for example, four times the sub-carrier frequency and only the samples in each set of four utilised.

The invention is of a particular value in connection with the encoding of a colour television signal constructed according to NTSC or PAL systems, but can also be used to encode a stereophonic audio signal in which a signal representing the difference between the two channel signals is modulated on a sub-carrier, typically of 38 KHz.

In order that the invention may be fully understood and readily carried into effect, it will now be described in greater detail with reference to the accompanying drawings, of which:

Figure 6:
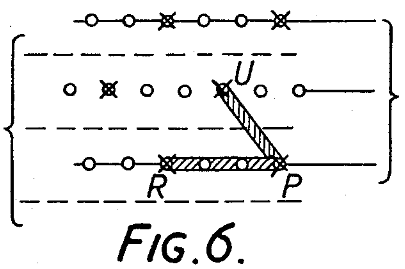
FIG. 6 is a diagram explaining the operation of the circuit of FIG. 5 when using in conjunction with a colour television signal constructed according to the NTSC system.
Figure 7:
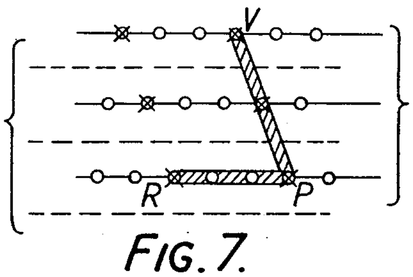
FIG. 7 is a diagram to be used in understanding the operation of FIG. 5 when used in conjunction with a colour television signal constructed according to the PAL system.
Figure 9:
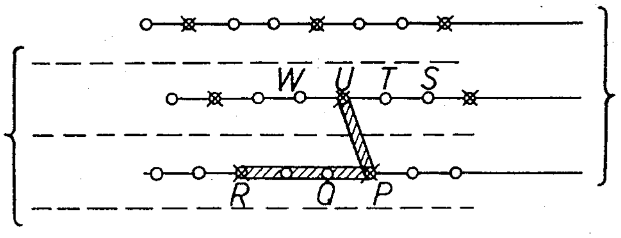
FIG. 9 is a diagram explaining the operation of the circuit of FIG. 8.

In FIGS. 6, 7 and 9 the small circles represent sampling points, the crosses indicate the sampling points having the same sub-carrier phase as the point P, and the dashed lines represent the interlaced scan lines of the other field.

Figure 1:
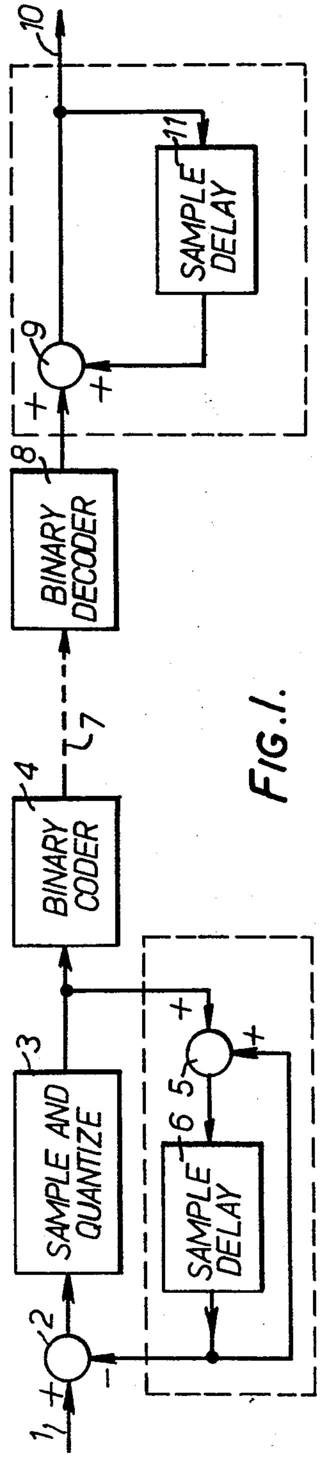
FIG. 1 is a diagram of a differential pulse code modulation system to which the invention can be applied.

The three essential features of the DPCM system shown in FIG. 1 are the operations of differentiation; quantisation and integration. The integration process at the receiver is complementary to the differentiation process at the transmitter.

The signal to be encoded is applied via a conductor 1 to an input of subtracting element 2. The difference signal from the element 2 is sampled and quantized in unit 3 and the quantized difference encoded in a binary coder 4. The quantized difference is also applied to an input of an adding element 5 from which a sum signal is passed through a delay circuit 6 to provide a subtracting input to the element 2 and a second input to the element 5. After transmission over a channel 7 the digitally encoded quantized difference signal is reconverted to analogue form by a binary decoder 8 and the analogue signals applied as one input to a second adding element 9. The sum signal from the element 9 forms the output of the system on conductor 10 and is also fed back via delay circuit 11 to form the second input to the element 9. Components 1 to 6 form the transmitter and components 8 to 11 the receiver, these being linked by the digital transmission channel 7.

In the operation of FIG. 1, it being assumed that the delays imposed by circuits 6 and 11 are equal to the time interval between successive samples, the difference between the instantaneous value of the input signal and the total of the previously sampled differences appears at the output of the element 2 and is quantized and digitized for transmission to the receiver. The delay circuit 6 with the adder 5 and the positive feedback connection together act as an integrator of the quantised differences from the circuit 3. The generation of the successive quantised differences takes place only during the sampling instants because the delay of the circuit 6 is equal to the integral between sampling instants or in the case of subsequent examples to be described is equal to a multiple of the interval between sampling instants. In the receiver the differences are totalled to regenerate the input signal again. It should be noted that the output of the delay circuit 6 is a duplicate of the output of the receiver on conductor 10. Because the system transmits quantized differences it is possible for the receiver's integrator to accumulate quantizing error unless the quantizer is placed within the feedback loop at the transmitter which performs the differentiation. Thus the quantized difference which is transmitted is not the difference between two input picture samples but is the difference between a new picture sample and the accumulation of all the quantized differences previously sent to the receiver. Thus the transmitter and receiver build up identical decoded pictures and use the same reference signal for addition to each successively transmitted difference.

Figure 2:
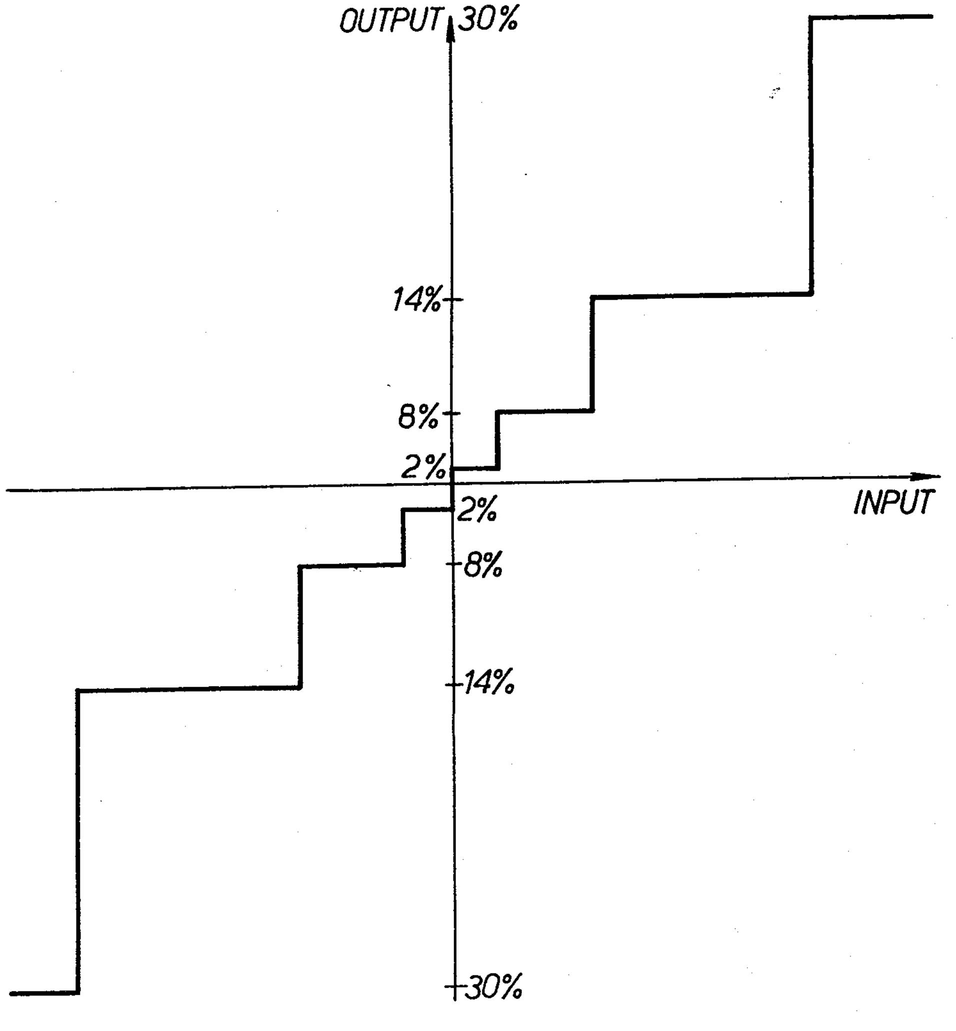
FIG. 2 is a diagram showing one example of suitable tapered quantization levels which can be employed.

The subjective justification for the application of DPCM to monochrome television is that the eye is particularly critical of noise and quantizing contours in a low-detail (i.e. gradually changing) regions of a picture while considerable noise and amplitude distortion can be tolerated on samples in detailed regions and at edges or boundaries. The combined operations of differentiation followed by tapered quantization, as shown in FIG. 2, have the effect of separating the area of low and high detail and of quantizing these areas accordingly. In low detail regions where the sample-differences are small the system operates at the centre of the tapered quantizer characteristic and makes suitably small quantizing errors. As picture detail and the sample difference amplitude increase, quantizing errors are increased proportionately. Optimum use can therefore be made of a restricted number of quantizing levels by adjusting the inner thresholds to minimize granularity (i.e. noise) and contouring in low detail areas, while compromising to make the outer levels as large as possible to reduce an effect known as "slope overload" which arises in the following way.

The DPCM system transmits samples describing the instantaneous slope of the picture signals so that coarse quantization has the effect of restricting the rate at which the system output can follow a rapidly changing input signal particularly one of large amplitude. Typically, for a 3 bit/sample (i.e. 8 quantization levels) DPCM system, the output levels of the tapered characteristic (FIG. 2) might be ±2%, ±8%, ±14%, ±30%, of the peak input video amplitude. Thus this system would need over three sample periods to construct a sudden black to white transition and would perceptibly blur such an edge in the picture. Of course, for input transitions of just less than 30% the rise time would be preserved and for some edges the system may even overshoot.

Figure 3:
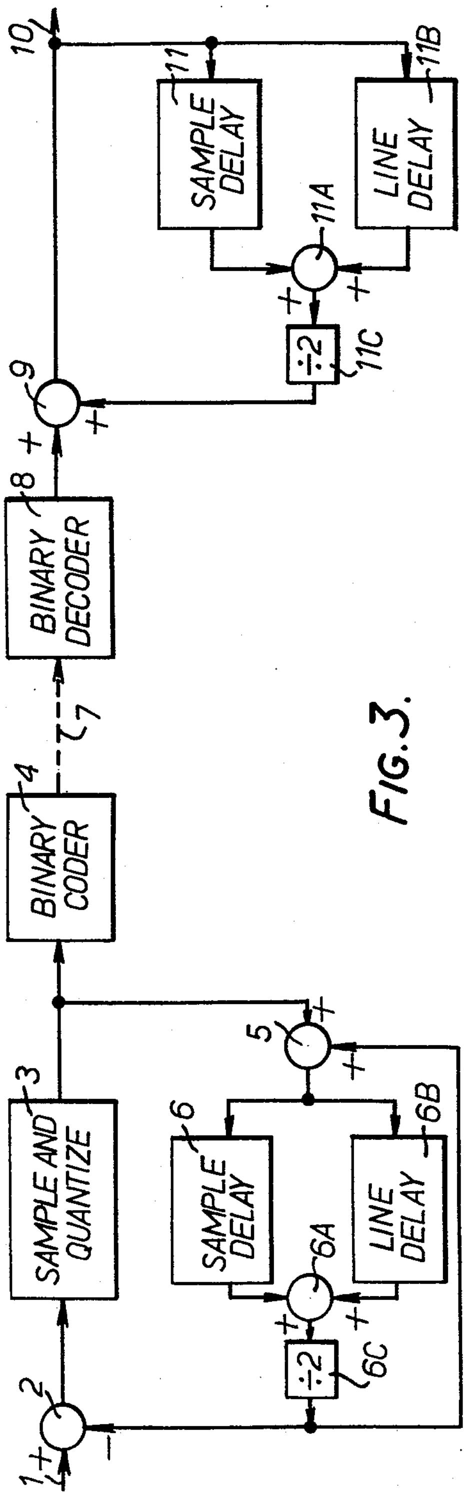
FIG. 3 is a schematic diagram of another example of a differential pulse code modulation system to which the invention can be applied, suitable for a television video signal.

The DPCM system is based on the prediction that each sample of the television signal is going to be equal to the previous one and merely transmits to the receiver, sample by sample, the amount by which this prediction is in error. Prediction using other than the previous sample has been proposed, but it can be shown that within a television scan line there is negligible advantage to using more than the previous sample. With a restricted data rate and with the available levels adjusted to minimize granularity and contouring the DPCM system thus blurs vertical and near-vertical edges in the picture. If the "sample-delay" in circuits 6 and 11 of FIG. 1 is replaced by one television line scan period then previous line prediction may be realized, which behaves similarly except that blur now occurs on horizontal and near-horizontal edges in the picture. The blur is slightly worse than for previous-sample since the adjacent sample in the previous line is spatially further removed (being twice the line pitch away because of interlace) than the previous sample in the same line, however for a particular picture having a predominance of vertical edges the picture quality is far superior using previous-line rather than previous-sample prediction. To cope with all types of pictures an efficient system could be constructed using a combination of previous-line and previous-sample, a two-dimensional prediction as shown in FIG. 3. FIG. 3 differs from FIG. 1 in that the outputs of the delay circuits 6 and 11 are added in respective adding elements 6A and 11A to the outputs of additional delay circuits 6B and 11B and the same signals halved by dividers 6C and 11C respectively. This additional circuitry contributes prediction from the previous line samples. Slope overload now occurs predominantly on diagonal edges, but picture quality is in general superior to that using either prediction singly since the blurring associated with slope overload is reduced in that direction. Two-dimensional prediction has a corresponding advantage in respect of channel error performance the greatest difficulty of all differential encoders which have integrating receivers and which therefore prepetuate channel errors. It is usual to provide the DPCM integrator with a "leak" which limits the period for which an error is perpetuated but the streak caused by the impulsive error is much more visible than the single sample error which would occur in a conventional PCM system. Obviously the streak can be made shorter by increasing the integrator leak but the advantages of differential coding are then increasingly lost. With 2-dimensional DPCM, a given leak causes the error to decay simultaneously in both dimensions so that it is visible for a lesser distance in any one direction.

Figure 4:
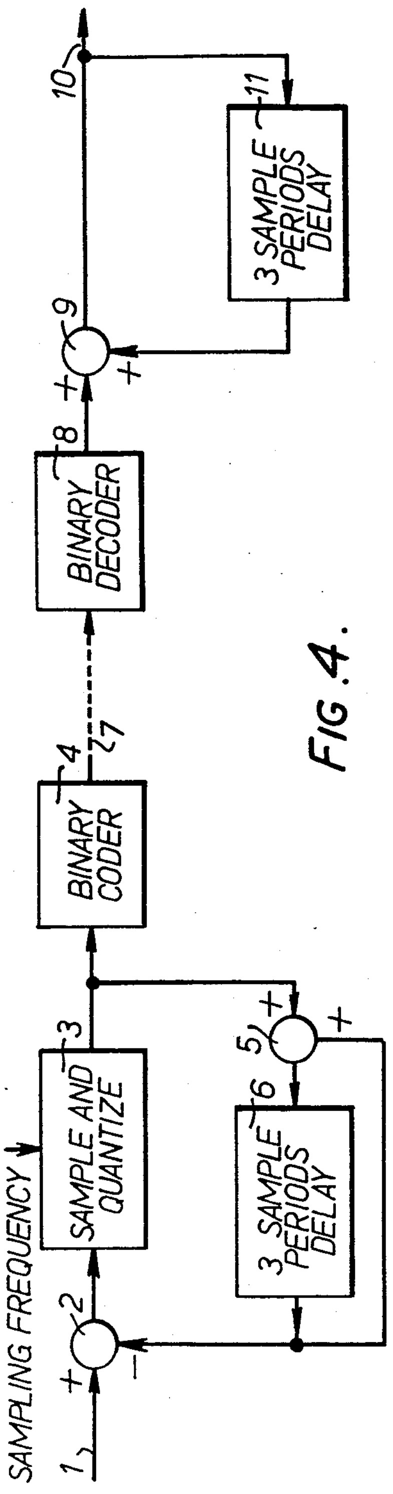
FIG. 4 shows modification of the diagram of FIG. 1 rendering it suitable for the digital transmission of a colour television signal in accordance with the invention.

The basis of the present invention lies in the fact that although "previous sample" or "nearest sample on previous line" prediction may minimize "slope overload" for monochrome television, it is not optimal for a carrier system of colour television such as PAL or NTSC. This difficulty can be overcome by locking the DPCM sampling frequency so that it bears a simple numerical relationship to the sub-carrier frequency and (for the within one line — i.e. one-dimensional-prediction) to use a sample, which may by synthesized, spaced by an integral number of cycles of the sub-carrier as the prediction rather than merely the previous sample. In the example of the invention to be described the DPCM sampling frequency is exactly three times the sub-carrier frequency and the previous-but-two sample is used as the prediction;

The previous-but-two sample was at exactly the same point in the sub-carrier cycle as the present sample and therefore provides an ideal prediction in areas of constant colour and brightness. In order to modify the arrangement of FIG. 1 to operate accordingly the sample delays 6 and 11 in both encoder and receiver are each arranged to have a 3 sample delay as shown in FIG. 4. A difference signal is generated at the quantizer input whenever the luminance of the input signal changes as in the case of a monochrome signal, and also when the phase of the sub-carrier changes at a colour boundary in the picture. The system therefore exhibits the normal slope overload behaviour at transitions, but maintains a complete cycle of sub-carrier circulating within the feedback loop so that no difference signal, and hence no de-saturation of colour, occurs in low detail areas of constant colour. The system can thus cope equally with monochrome or carrier-type colour signals, although slope overload is rather worse for the former than with previous-sample DPCM because the prediction is three times further away in the picture. It has been verified experimentally that no loss of colour saturation occurs, and that with suitable adjustment of a tapered quantizer characteristic of only eight levels the slope overload is not much worse at colour boundaries than that imposed by the normal PAL colour bandwidth restrictions. Slope overload on full black-to-white transitions in a monochrome picture is however, quite severe with only 3 bits/sample coding (equivalent to 8 quantizing levels) and for satisfactory performance 4 or more bits per sample should be used. As has been proposed for monochrome television, previous-line prediction may also be usefully employed for colour DPCM in accordance with the invention. In fact, for NTSC a superior picture to that using same-line prediction can be obtained by using as the prediction the nearest sample on the previous line which lies at the same point in the sub-carrier cycle, since it is only about two picture elements removed (due to interlace) whereas with same-line prediction the distance is three elements. This advantage can also be obtained with the PAL signal if some technique is employed to overcome the difficulty of the line by line phase reversal of the red colour difference signal as described below.

Exact distances are evaluated below for PAL and NTSC signals by way of examples. These distances take account of the quarter-line and half line offsets (respectively) in sub-carrier frequency which were originally included to minimize the visibility of the colour components on a compatible monochrome receiver. The offsets have the result that the optimum DPCM loop delays are not exactly one line period.

For the PAL system, the line by line phase reversal of the red colour-difference signal has the result that previous line prediction requires the delay in the DPCM loop to be switched in antiphase to the PAL switch and by an amount dependent on the picture hue. Therefore, previous-line prediction cannot be used with PAL signals unless some technique is employed to overcome the effect of the PAL switch. However, it is possible to use the previous-but-one line in the prediction since alternate lines have the same sub-carrier phase but this has the disadvantage that the predicted sample is twice as far removed as it need be for NTSC signals and vertical slope overload will be worse than the horizontal slope overload arising from same-line prediction.

Figure 5:
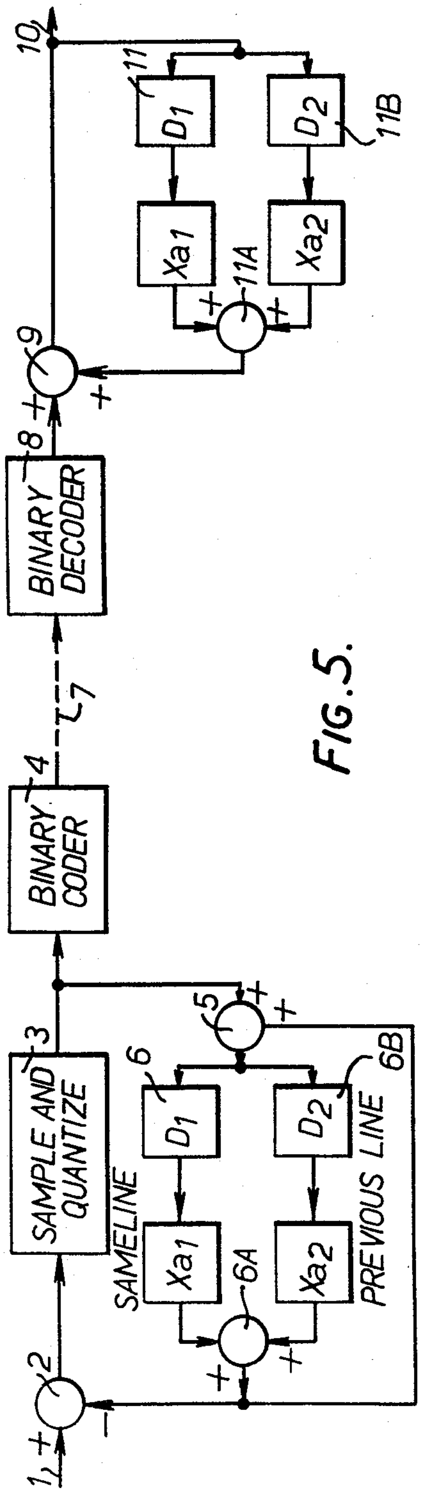
FIG. 5 shows a generalization of the circuit of FIG. 3.

The following examples of encoding of PAL and NTSC signals refer to FIG. 5 which shows an arrangement for a system which combines the same-line and the previous-line predictions (defined by the relative delays $D_1$ and $D_2$) according to weights $a_1$ and $a_2$ respectively. Clearly for same line prediction only $a_2=0$ and $a_1=1$ while for previous line prediction only $a_1=0$ and $a_2=1$. For the combined prediction $a_1+a_2=1$ (so that the loop gain for sub-carrier is unity and colour saturation is maintained) while the individual values of $a_1$ and $a_2$ can be chosen subjectively according to the distances of the respective predictions calculated below.

EXAMPLE 1

A colour television signal constructed in accordance with the NTSC system but employing European standards of 625 lines per frame and 50 fields per second, using interlaced scanning requires a 4.4296875 MHz sub-carrier this being an odd harmonic of half-line frequency (15.625 KHz). A DPCM sampling frequency of 13.2890625 MHz is proposed according to an example of the invention, and the sample period is therefore 75.24985 nS. The required delay ($D_1$ in FIG. 5) for the same-line prediction loop is 225.75 nS, represented by PR in FIG. 6, and the delay for the previous line loop ($D_2$) is one line period ± ½ cycle of sub-carrier represented by the line PU as shown in FIG. 6. Hence $D_2$=64 $\mu$S ± 112.875 nS.

Using same-line prediction, the blue due to slope overload and any streaks due to channel errors will obviously be horizontal. With previous line prediction only such streaks will be at 40° to the vertical because of the half-line frequency offset and taking account of the Kell factor. The picture edges to suffer most slope overload will therefore be those at 40° to the horizontal. For a combination of both predictions slope overload will be worst at some angle intermediate to vertical and 60° to the vertical depending on the combination. On account of the different distances of the two predictions these would not necessarily be combined with equal weight, the previous line prediction could be accorded the greater weight as it is the nearer in distance; that is to say PU is shorter than PR.

EXAMPLE 2

A colour television signal constructed according to the NTSC system and using the U.S. standards of 525 lines/frame and 60 fields/sec requires a 3.579545 MHz sub-carrier, this again being an odd multiple of half line frequency. The composite video bandwidth is only 4.5 MHz.

The same considerations apply as for European NTSC except that the different Kell factor influences the direction of words slope overload using previous line prediction and the respective weights with which the individual predictions should be combined. The previous line prediction, being the nearer in distance, again will be superior to the same-line prediction.

EXAMPLE 3

For a PAL colour television signal using European scanning standards there is required a 4.43361875 MHz sub-carrier frequency this being an odd harmonic of quarter line frequency (15.625 KHz). The DPCM sampling frequency produced in accordance with an example of the invention is 13.30085625 MHz and therefore the sample period is 75.183 nS. The required delay ($D_1$) in the same-line loop is therefore 225.56 nS, represented by the line PR of FIG. 7, and DPCM using this prediction only will perform exactly as in NTSC (except for the usual advantage of the PAL system that any phase distortion is converted to amplitude distortion by averaging over two lines).

Previous line prediction is complicated by the PAL switch which changes the red colour-difference signal phase by 180° on alternate lines. Thus in areas with no blue difference signal the physical length of the delay line ($D_2$) should be switched ± 56.39 nS in antiphase with the PAL switch to maintain an optimum prediction. In areas with no red difference signal however there is effectively no phase switching line by line and the optimum delay line length is constant at one line period + 56.39 nS. It is impossible therefore to maintain an optimum prediction by a simple switch since the physical length of the delay line is required to change continuously with the hue of the picture.

A simpler alternative is to use previous-but-one line prediction for which the optimum delay is independent of the PAL switch and is equal to the two line periods ±½ cycle of sub-carrier (see FIG. 7). Hence $D_2$=128 $\mu$S ± 112.78 nS. Blur due to slope overload and streaks due to channel errors will make an angle of 23° with the vertical for this prediction alone. The distance of the prediction is greater than for same-line prediction but is not too great to make a useful contribution to a combined prediction. The predictions should be combined so that more effective prediction is that spaced by the minimum distance, although even a simple average yields improved picture quality compared to that with same-line prediction.

Figure 8:
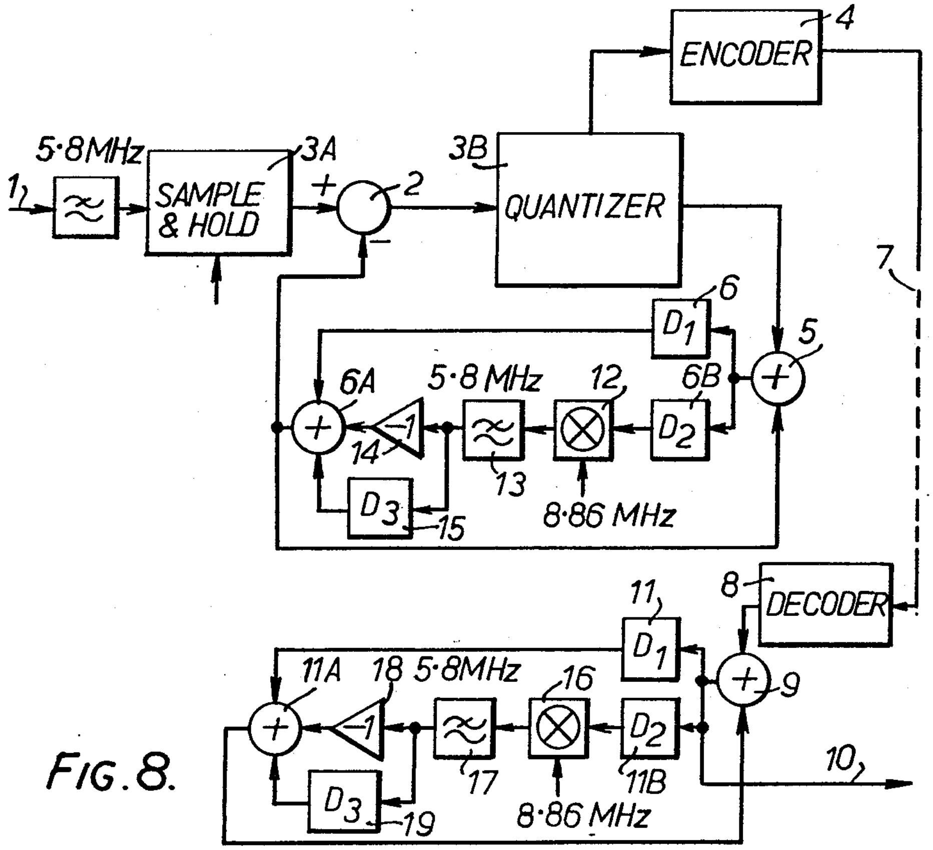
FIG. 8 shows a modification of FIG. 5 including a PAL modifier.

In the PAL system, a prediction can be obtained from the previous line by means of a circuit known as a PAL modifier. Modulation of the chrominance signal by a sinusoid of twice sub-carrier frequency (i.e. 8.86 MHz) generates the conjugate colour signal plus components near the third harmonic of sub-carrier which can be removed by a 5.8 Mhz low-pass filter. FIG. 8 shows the circuit of FIG. 5 with the additoin of the PAL modifiers 12 and 16 and low-pass filters 13 and 17. The insertion of a PAL-modifier in the previous line delay path incorporating the delay 6B and the multiplier $a_2$ of FIG. 5 therefore generates a correct chrominance prediction from a point 'U' in the previous line as shown in FIG. 9. This conjugate chrominance signal is corrupted by spectrally inverted luminance energy within the chrominance pass-band, which could be avoided by the use of a comb filter at the input of the PAL-modifier but this may cause some loss of vertical definition.

A PAL-modifier used as described above with reference to FIG. 8 generates a chrominance prediction but it is necessary to supplement this with a luminance signal prediction, since to use only the high frequency components of a prediction is equivalent to using a DPCM integrator with a rapid leak causing severe leak contouring and granularity. A split-band prediction can be used, obtaining chrominance via a PAL-modifier and luminance directly from a comb filter, and deriving these predictions separately from the respective samples which minimize the overall prediction distance. Note that the previous line (chrominance) prediction distance with PAL is shorter than that of NTSC due to the respective offsets between adjacent lines in a field of ¼ and ½ sub-carrier cycle; compare, for example, PU of FIG. 6 with PU of FIG. 9.

Where split-band prediction is to be employed, another approach is to use trigonometric addition or subtraction to compute chrominance predictions for neighbouring samples at dissimilar points in the sub-carrier cycle. This is relatively simple when the sampling frequency is exactly three times the sub-carrier frequency and the sample phases can only differ by ± $2\pi/3$. Consider for example the arrangement shown in FIG. 8, in conjunction with FIG. 9. In FIG. 8, $D_1$ is chosen to be $D_{PQ}$, the time delay between points P and Q, $D_2$ is equal to $D_{PS}$, and $D_3$ is equal to $D_{SU}$. A composite prediction is obtained by threefold combination of the previous sample, 'Q', and two samples on the previous line, 'S' and 'U', which are delayed from the predicted point 'P' by $D_{PS}$ and $D_{PS} \pm D_{SU}$ respectively. The luminance prediction is obtained only from Q (which is possible because the sub-carrier is not involved), but has the smallest prediction distance of 1.1 min. arc when viewed at six times picture height, whereas the chrominance prediction is two-dimensional. In FIG. 9, if the point P has sub-carrier phase $\phi$, and the composite signal at this point is $$v_P(t) = Lum_p + C_p \sin (wt + \phi),$$

where $Lum_p$ is the luminance signal at P and $C_p$ is the amplitude at P of the colour sub-carrier of frequency $W/2\pi$, then the previous sample, Q, can be represented:

$$v_Q(t) = Lum_Q + C_Q \sin \left(wt + \phi) - \frac{2\pi}{3}\right)$$

After PAL modification indicated by an asterisk (*) the subcarrier at point U has similar phase to that at P; ie, $v_U^*(t) = C_U \sin (wt + \phi)$.

'S', the next but one sample to U, has similar phase after PAL modification to Q:

$$v_S^*(t) = C_S \sin \left(wt + \phi - \frac{2\pi}{3}\right)$$

Hence, if $C_S = C_Q$, the bandwidth restriction of the chrominance channel helping to ensure that any difference from equality is small.

$$v_Q(t) - v^*_S(t) + v^*_U(t) = Lum_Q + C_U \sin (wt + \phi)$$

which is generally a good prediction for point P.

In FIG. 7, the PAL modifier and other circuit components are assumed to have zero propagation delay except for the delay elements $D_{PQ} = 75.183$ nS, $D_{PS} = 64\ \mu S + 56.39$ nS $- 150.37$ nS $= 63.9\ \mu S$, and $D_{SU} = 2\ (75.185) = 150.37$ nS.

In FIG. 9, the point W may be used instead of point S for the previously described prediction $v_Q(t) - v^*_S(t) + v^*_U(t)$. This produces the prediction $v_Q(t) - v^*_W(t) + v^*_U(t)$ which can be realised in FIG. 8 by changing the delays $D_2$ to $D_{PU}$, $D_3$ to $D_{UW}$, and by putting the inverting amplifier (14, 18) in the path of the delay element $D_3$ (15, 19). This prediction is advantageous through the closer proximity of W to Q then S to Q, giving better cancellation of the chrominance component of $v_Q(t)$.

Derivation of chrominance predictions from neighbouring samples at dissimilar points in the sub-carrier cycle by trigonometric addition or subtraction can still be used when the sampling frequency is not integrally or harmonically related to sub-carrier frequency. Three times sub-carrier frequency is in any case an excessive sampling frequency for a signal of bandwidth only 5.5 MHz and it is feasible to design low pass filters which provide sufficient suppression of aliasing for sampling frequencies as low as 12.5 Mhz. Provided that the sampling frequency is known and stable, weighting coefficients can be derived appropriate to certain neighbouring samples which will ensure unity gain in the prediction loops of both the chrominance and luminance components of the signal.

I claim:

1. A method of encoding an input signal which includes a high-frequency component of frequency $f$ to provide an encoded output signal, comprising the steps of:

sampling at a sampling frequency substantially equal to $Nf$, where N is a ratio of small integers, taking the difference between the value of said input signal at each sampling instant and the value of said input signal represented by said output signal at an instant corresponding to a sampling instant which is substantially an integral number of cycles earlier at frequency $f$; and encoding said difference with a non-linear quantizing scale to provide said output signal, whereby modulation of said high-frequency component is encoded with increased accuracy.

2. A method according to claim 1, wherein said sampling takes place simultaneously with said encoding.

3. A method according to claim 1, wherein N is an integer greater than one, and the difference is taken between the value of said input signal at each sampling instant and the value of said input signal represented by said output signal at an instant corresponding to the sampling instant which is N sampling instants earlier.

4. A method of encoding an input colour television signal according to claim 1, wherein the colour subcarrier is of frequency $f$.

5. A method of decoding a transmitted signal consisting of a series of encoded samples having a sampling frequency substantially equal to $Nf$, where N is a ratio of small integers, said method comprising the steps of decoding each incoming sample, and adding each incoming sample to the accumulated value of those preceding samples separated by substantially an integral number of cycles at frequency $f$ to provide an output signal, whereby a signal having a component of frequency $f$ is accurately reconstructed.

6. A method of decoding a transmitted signal representative of a colour television signal, according to claim 5, wherein the colour subcarrier of the television signal is of frequency $f$.

7. Decoding apparatus for decoding a transmitted signal consisting of a series of encoded samples having a sampling frequency substantially equal to $Nf$, where N is a ratio of small integers, said apparatus comprising an input terminal; means connected to the input terminal for decoding each incoming sample; and means for adding each incoming sample to the accumulated value of those preceding samples separated by substantially an integral number of cycles at frequency $f$ to provide an output signal, whereby a signal having a component of frequency $f$ is accurately reconstructed.

8. Apparatus according to claim 7, wherein said decoding means is arranged to provide an analogue signal, and said adding means comprises an adder having one input connected to the output of said decoding means, and a delay device providing a delay of substantially an integral number of cycles at frequency $f$ connected between the output and a second input of said adder.

9. A method of digitally encoding an analogue signal which comprises a base band signal and a sub-carrier signal of frequency $f$ which sub-carrier signal is subject to modulation, comprising the steps of:

sampling the amplitude of the analogue signal at a sampling frequency substantially equal to $Nf$, where N is a ratio of small integers, forming difference signals each representing the difference between the amplitude of the analogue signal at each sampling instant and a recorded value representing the amplitude of the analogue signal at an instant corresponding to a sampling instant which is substantially an integral number of cycles earlier at frequency $f$, and encoding the difference signals in digital form.

10. A method according to claim 9, in which to produce each difference signal the amplitude of the analogue signal at each sampling instant has subtracted from it a combination of the first-mentioned recorded value and a second recorded value representing the amplitude of the analogue signal at a second instant corresponding to a sampling instant which is substantially a second integral number of cycles earlier at the frequency *f* of the sub-carrier.

11. A method according to claim 9, wherein before being encoded in digital form the difference signal is subjected to tapered quantisation in which the quantisation levels are closely spaced for small signal values and more widely spaced for larger signal values.

12. A method according to claim 9, wherein the sampling frequency is three times the frequency of the subcarrier.

13. A method according to claim 9, wherein the recorded value is derived by sampling the analogue signal at an earlier time, spaced from the instantaneous value of the signal with which it is compared, by an integral number of cycles of the sub-carrier.

14. A method according to claim 13, wherein the integral number is one.

15. A method according to claim 10, in which the analogue signal is a colour television video signal, the first-mentioned integral number is one, and the time interval represented by the second integral number of cycles of the sub-carrier is about one line period of the scan by which the video signal was generated.

16. A method according to claim 10, in which the analogue signal is a colour television video signal constructed in accordance with the PAL system, the first-mentioned integral number is one, and the time interval represented by the second integral number of cycles of the sub-carrier is about two line periods of the scan by which the video signal was generated.

17. A method according to claim 15, in which the colour television video signal is constructed according to the PAL system, and the second recorded value is derived from the video signal after combining it with a sinusoidal oscillation of frequency twice that of the sub-carrier, so as to compensate for the reversal of the phase of the colour sub-carrier relative to a particular phase in alternate lines of the scan by which the video signal was produced.

18. A method according to claim 9, wherein the sampled value of the base band component is subtracted from a second sampled value of the base band component derived at a previous sampling instant, and the sampled value of the sub-carrier wave is compared with a second value of the sub-carrier wave, produced by combining several previous values, the times of deriving the previous values from the analogue signal and the manner of combination producing the second value of the sub-carrier wave being such that the second value corresponds to a valule of the sub-carrier wave spaced in time from the sampled value of the sub-carrier wave by an integral number of cycles of the subcarrier.

* * * * *